(12) United States Patent
Inokuma et al.

(10) Patent No.: US 10,601,359 B2
(45) Date of Patent: Mar. 24, 2020

(54) MOTOR-CONTROL DEVICE

(71) Applicant: DENSO CORPORATION, Kariya, Aichi-pref. (JP)

(72) Inventors: Kenji Inokuma, Kariya (JP); Takashi Satou, Kariya (JP); Tomoyuki Shinkai, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/087,676

(22) PCT Filed: Jan. 30, 2017

(86) PCT No.: PCT/JP2017/003117
§ 371 (c)(1),
(2) Date: Sep. 24, 2018

(87) PCT Pub. No.: WO2017/163609
PCT Pub. Date: Sep. 28, 2017

(65) Prior Publication Data
US 2019/0115865 A1 Apr. 18, 2019

(30) Foreign Application Priority Data

Mar. 25, 2016 (JP) .................................. 2016-061358

(51) Int. Cl.
*G01R 31/02* (2006.01)
*H02P 29/64* (2016.01)
(Continued)

(52) U.S. Cl.
CPC ................ *H02P 29/64* (2016.02); *B60K 6/26* (2013.01); *H02K 9/19* (2013.01); *H02K 11/25* (2016.01); *H02P 23/009* (2013.01); *H02P 23/14* (2013.01)

(58) Field of Classification Search
CPC ......... H02P 29/60; H02P 29/66; H02K 11/25; F01P 11/12
See application file for complete search history.

(56) References Cited

U.S. PATENT DOCUMENTS

2005/0285457 A1   12/2005  Tsutsui et al.
2016/0332521 A1   11/2016  Suzuki
2017/0370276 A1*  12/2017  Nakai ..................... F01P 11/02

FOREIGN PATENT DOCUMENTS

JP      2007-116792 A    5/2007
JP      2008-109816 A    5/2008
(Continued)

OTHER PUBLICATIONS

Apr. 4, 2017 International Search Report issued in International Patent Application No. PCT/JP2017/003117.

*Primary Examiner* — Karen Masih
(74) *Attorney, Agent, or Firm* — Oliff PLC

(57) ABSTRACT

A motor control device includes coil temperature detection means, cooling oil temperature detection means, and a control unit. The control unit implements a coil protection torque restriction and a cooling oil protection torque restriction. The control unit makes it easier for the coil protection torque restriction to be preferentially implemented in a low rotation operating region in which a motor operates at a low rotation speed equal to or lower than a predetermined value, and makes it easier for the cooling oil protection torque restriction to be preferentially implemented in a high rotation operating region in which the motor operates at a higher rotation speed than in the low rotation operating region.

17 Claims, 14 Drawing Sheets

(51) Int. Cl.
*H02K 11/25* (2016.01)
*H02P 23/00* (2016.01)
*B60K 6/26* (2007.10)
*H02K 9/19* (2006.01)
*H02P 23/14* (2006.01)

(56) References Cited

FOREIGN PATENT DOCUMENTS

| | | |
|---|---|---|
| JP | 2008-178243 A | 7/2008 |
| JP | 2013-085388 A | 5/2013 |
| JP | 2013-198378 A | 9/2013 |

\* cited by examiner

FIRST EMBODIMENT

FIRST EMBODIMENT

FIRST EMBODIMENT

FIRST EMBODIMENT

SECOND EMBODIMENT

SECOND EMBODIMENT

THIRD EMBODIMENT

FOURTH EMBODIMENT

FIG.12 FIFTH EMBODIMENT

SEVENTH EMBODIMENT

MOTOR-CONTROL DEVICE

CROSS-REFERENCE TO RELATED APPLICATION

The present application claims the benefit of priority from earlier Japanese Patent Application No. 2016-061358 filed on Mar. 25, 2016, the entire description of which is incorporated herein by reference.

TECHNICAL FIELD

The present disclosure relates to a motor-control device that is cooled by cooling oil inside a housing.

BACKGROUND ART

As a technique for preventing overheating of a motor, for example, there is a device as described in Patent Document 1. This device includes an oil temperature sensor for detecting the temperature of oil inside a motor housing, and this device calculates a winding temperature based on oil temperature detected by the oil temperature sensor, and the heat capacity and the thermal resistance of the motor, and detects the motor temperature based on the winding temperature. The torque of the motor is restricted when the detected motor temperature is equal to or higher than a predetermined value.

CITATION LIST

Patent Literature

[PTL 1]: JP 2013-085388 A

SUMMARY OF THE INVENTION

In a motor that is cooled by cooling oil inside a housing, the parts that are likely to overheat vary depending on the operating region. In other words, since the cooling oil is scooped up by the rotation of the rotor, the cooling oil does not sufficiently diffuse in a region where the rotation speed of the motor (in other words, the rotation speed of the rotor) is low, and the coil is easily overheated. On the other hand, in a region where the rotation speed of the motor is high, the cooling oil is sufficiently diffused to make it difficult for the coil to overheat, however since the heat generation amount of the coil is large, the cooling oil tends to overheat.

However, as a result of detailed examination by the inventors, the technique of the above Patent Document 1 does not take into consideration at all that the portions susceptible to overheating differ depending on the operating region of the motor as described above, and because the output torque of the motor is merely restricted when the motor temperature is equal to or higher than a predetermined temperature, a problem was found in that there is a possibility that portions which are easily overheated may not be able to be properly protected.

Therefore, an object of the present disclosure is to provide a motor-control device capable of appropriately protecting portions that are likely to overheat in a motor cooled by cooling oil inside a housing.

In order to solve the problems described above, the technology according to the present disclosure is a motor configured by arranging a stator and a rotor inside a housing, and a motor-control device that is cooled by cooling oil inside the housing. This motor-control device includes coil temperature detecting means, cooling oil temperature detecting means (32), and a control unit. The coil temperature detecting means detects a temperature of a coil provided on the stator. The cooling oil temperature detecting means detects a temperature of the cooling oil. The control unit implements a coil protection torque restriction, and a cooling oil protection restriction. The coil protection torque restriction restricts the torque of the motor in a case where the temperature of the coil detected by the coil temperature detecting means exceeds a coil protection threshold value. The cooling oil protection torque restriction restricts the torque of the motor in a case where the temperature of the cooling oil detected by the cooling oil temperature detecting means exceeds a cooling oil protection threshold value. The control unit makes it easier for the coil protection torque restriction to be preferentially implemented in a low rotation operating region in which the motor operates at a low rotation speed equal to or lower than a predetermined value, and makes it easier for the cooling oil protection torque restriction to be preferentially implemented in a high rotation operating region in which the motor operates at a higher rotation speed than in the low rotation operating region. The technique according to the present disclosure is not limited to a configuration in which the motor is cooled by cooling oil enclosed inside the housing but also includes a configuration in which the motor is cooled by cooling oil introduced from the outside into the housing and the like.

With the technique according to the present disclosure, in the case where the temperature of the coil detected by the coil temperature detecting means exceeds the coil protection threshold value, overheating of the coil can be prevented by implementing the coil protection torque restriction that restricts the motor torque. In addition, in the case where the temperature of the cooling oil detected by the cooling oil temperature detecting means exceeds the cooling oil protection threshold value, overheating of the cooling oil can be prevented by implementing the cooling oil protection torque restriction that restricts the motor torque.

Moreover, in a low rotation operating region, it easier to preferentially implement the coil protection torque restriction, and by preferentially implementing the coil protection torque restriction in the low rotation operating region where the coil is likely to overheat, it is possible to reliably prevent overheating of the coil, and thus it is possible to suitably protect the coil. On the other hand, in a high rotation operating region, it easier to preferentially implement the cooling oil protection torque restriction, and by preferentially implementing the cooling oil protection torque restriction in the high rotation operating region where the cooling oil is likely to overheat, it is possible to reliably prevent overheating of the cooling oil, and thus it is possible to suitably protect the cooling oil.

DESCRIPTION OF EMBODIMENTS

Figure 1:
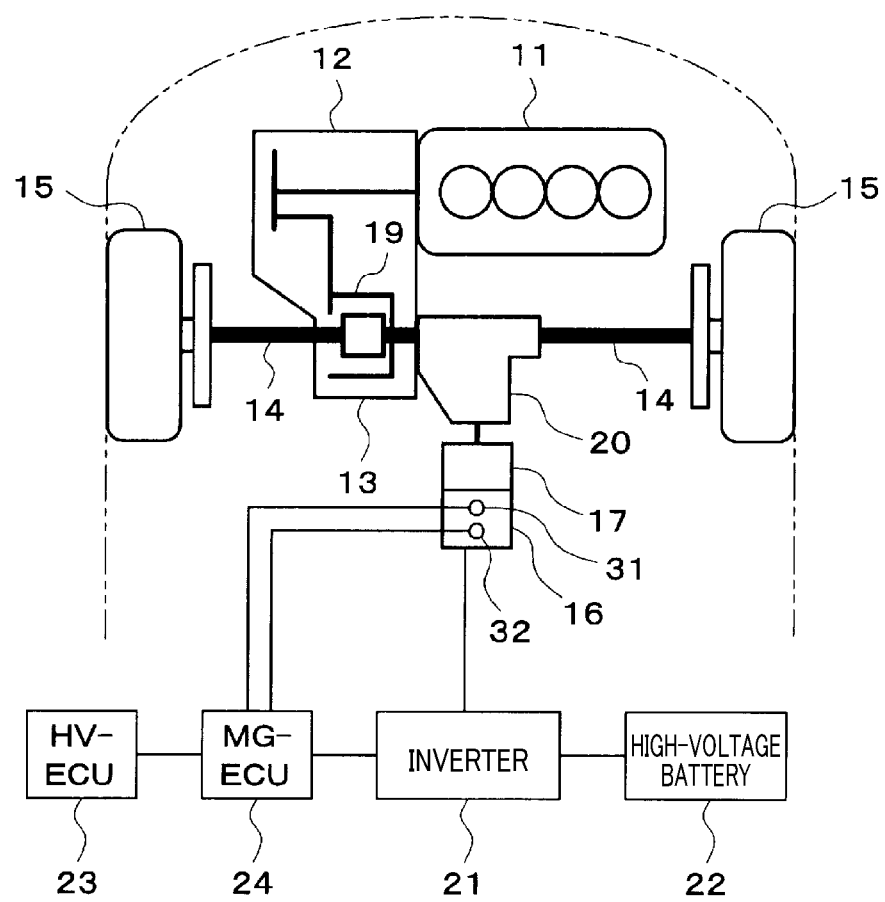
FIG. 1 is a diagram illustrating a schematic configuration of a control system for a hybrid vehicle of a first embodiment according to the present disclosure.

Hereinafter, some embodiments embodying modes for carrying out the technique according to the present disclosure will be explained.

First Embodiment

A first embodiment according to the present disclosure will be explained based on FIG. 1 to FIG. 7.

First, a schematic configuration of a control system for a hybrid vehicle will be explained based on FIG. 1.

An engine 11 as a power source of a vehicle and a transmission 12 connected to the engine 11 are mounted on the front side portion of the vehicle. The transmission 12 is a mechanical type of transmission, and may be a stepped transmission that switches transmission stages in a stepwise manner from among a plurality of transmission stages, or may be a continuously variable transmission (so-called CVT) that continuously changes speed. The engine 11 and the transmission 12 are arranged horizontally so that the axial direction of the output shaft (in other words, the crankshaft) of the engine 11 is in the lateral direction of the vehicle. The power of the output shaft of the engine 11 is transmitted to the transmission 12, and the power of the output shaft of the transmission 12 is transmitted to the drive shaft 14 of the wheels 15 via a differential gear mechanism 13 or the like.

Furthermore, a small-diameter motor generator (hereinafter referred to as "MG") 16 serving as a power source of the vehicle and a small-diameter reduction gear 17 connected to the MG 16 are mounted on the rear side of the engine 11 and the transmission 12. The MG 16 and the speed reducer 17 are arranged vertically so that the axial direction of the output shaft is in the longitudinal direction of the vehicle. The output shaft of the speed reducer 17 is connected to a ring gear 19 of the differential gear mechanism 13 (in other words, the gear to which the power of the output shaft of the transmission 12 is inputted) via a transfer mechanism 20. As a result, the power of the output shaft of the MG 16 is transmitted to the speed reducer 17, and the power of the output shaft of the speed reducer 17 is transmitted to the drive shaft 14 of the wheels 15 via the transfer mechanism 20, the differential gear mechanism 13, and the like.

In addition, an inverter 21 for driving the MG 16 is connected to a high-voltage battery 22, and the MG 16 exchanges power with the high-voltage battery 22 via the inverter 21. The high-voltage battery 22 is a direct-current power source including a secondary battery or the like. The inverter 21 converts the direct-current (DC) voltage of the high-voltage battery 22 into an alternating-current (AC) voltage to drive the MG 16 in accordance with a torque command value from an HV-ECU 23 described later, and drives the MG 16 by restricting the torque command value as necessary.

The HV-ECU 23 is a control device that comprehensively controls the entire vehicle, and reads output signals of various sensors and switches (for example, an accelerator sensor, a shift switch, a brake switch, a vehicle-speed sensor, and the like). The HV-ECU 23 transmits and receives control signals and data signals to and from an MG-ECU 24 and an engine ECU (not illustrated in the figures) or the like. The MG-ECU 24 is a control device that controls the MG 16 by controlling the inverter 21, and the engine ECU is a control device that controls the operation of the engine 11.

The HV-ECU 23, by each ECU, controls the engine 11, the MG 16, and the like according to the operating state of the vehicle. When doing this, the HV-ECU 23 switches a running mode between, for example, an engine running mode, an assisted running mode, and an EV running mode. In the engine running mode, engine running is performed using only the power of the engine 11 of the engine 11 and the MG 16, which drives the wheels 15 and causes the vehicle to move. In the assisted running mode, assist running is performed using both the power of the engine 11 and the power of the MG 16, which drives the wheels 15 and causes the vehicle to move. In the EV running mode, EV running is performed using only the power of the MG 16 of the engine 11 and the MG 16, which drives the wheels 15 and causes the vehicle to move.

Moreover, the HV-ECU 23 switches the running mode to a regenerative power generation mode when braking the vehicle (for example, when generating a braking force at the time of accelerator OFF and brake ON). In this regenerative power generation mode, by driving the MG 16 by the power of the wheels 15, regenerative power generation that converts the kinetic energy of the vehicle into electric energy by the MG 16 is performed, and a high-voltage battery 22 is charged with the regenerative power that is the generated power.

Figure 2:
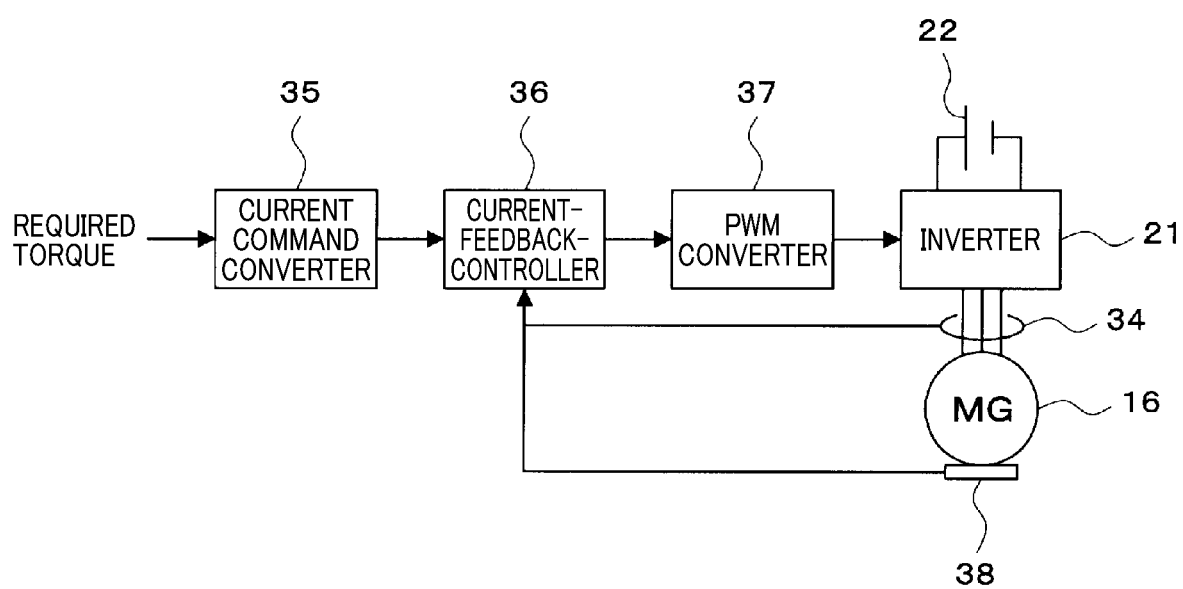
FIG. 2 is a block diagram for explaining MG torque control.

Next, torque control of the MG 16 will be explained based on FIG. 2.

The MG 16, for example, is a three-phase permanent magnet type synchronous motor that is equipped with a permanent magnet, and a rotational position sensor 38 for detecting a rotational position θ (in other words, a rotational angle) of a rotor 27 is mounted in the MG 16. The inverter 21 drives the MG 16 by converting the DC voltage of the high-voltage battery 22 into three-phase AC voltages U, V, W based on three-phase six-arm voltage command signals UU, UL, VU, VL, WU, WL outputted from the MG-ECU 24. A U-phase current iu flowing in the U phase and a W-phase current iw flowing in the W phase of the MG 16 are detected by a current sensor 34.

The MG-ECU 24 performs torque control for adjusting the AC voltage to be applied to the MG 16 by controlling the inverter 21 so that the output torque of the MG 16 becomes the required torque (in other words, the torque command value). In this torque control, current feedback control which controls the energizing of the MG 16 is performed in the following way so that difference between the current command value based on the required torque outputted from the HV-ECU 23, and the detected current value based on the output of the current sensor 34 is minimized. In doing so, feedback control is performed independently for both the d-axis current id and the q-axis current iq set as a rotor rotational coordinates of the MG 16 in a d-q coordinate system, which is a rotating coordinate system.

First, the MG-ECU 24, by a current command converter 35, calculates the command current vector (d-axis current command value Id, q-axis current command value Iq) based on the required torque and rotation speed of the MG 16 by using a map, an equation, or the like.

After that, the MG-ECU 24, by a current-feedback controller 36, based on the U-phase current iu and the W-phase current iw of the MG 16 detected by the current sensor 34, and the rotor rotational position θ of the MG 16 detected by the rotational position sensor 38, calculates a detection current vector (d-axis current detection value id, q-axis current detection value iq), which is a detected value of the current flowing in the MG 16. Then, the MG-ECU 24 finds a command voltage vector (d-axis voltage command value Vd, q-axis voltage command value Vq) by calculating a d-axis voltage command value Vd by PI control or the like so that the difference Δid between a d-axis current command value Id and a d-axis current detection value id is minimized, and calculating a q-axis-voltage command value Vq by PI control or the like so that the difference Δiq between a q-axis current command value Iq and a q-axis current detection value becomes iq is minimized.

After that, the MG-ECU 24, by a PWM converter 37, calculates three-phase voltage command values Vu, Vv, Vw by three-phase modulation or two-phase modulation based on the command voltage vector (d-axis voltage command value Vd, q-axis voltage command value Vq) and the rotor rotational position θ of the MG 16, and converts these three-phase voltage command values Vu, Vv, Vw to three-phase six-arm voltage command signals UU, UL, VU, VL, WU, WL by a sine wave PWM control method. The PWM converter 37 outputs these three-phase six-arm voltage command signals UU, UL, VU, VL, WU, WL to the inverter 21.

Next, the schematic configuration of the MG 16 will be described based on FIG. 3 and FIG. 4.

Figure 3:
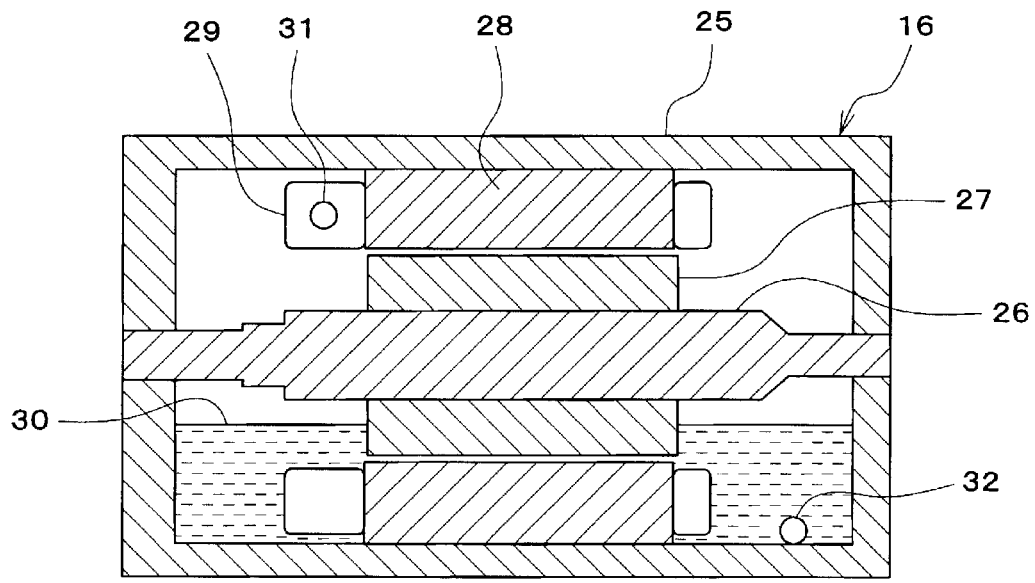
FIG. 3 is a longitudinal sectional view illustrating a schematic configuration of the MG of a first embodiment.
Figure 4:
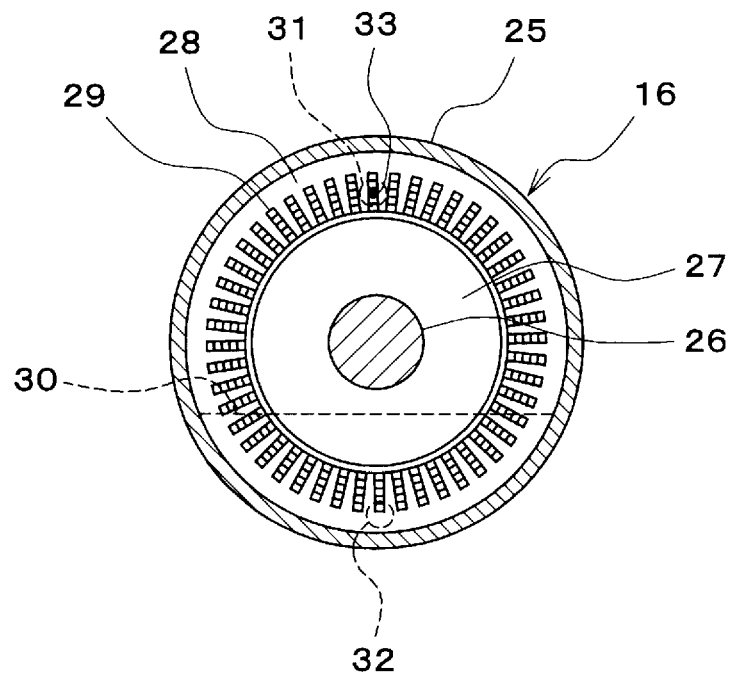
FIG. 4 is a transverse sectional view illustrating a schematic configuration of the MG of a first embodiment.

As illustrated in FIG. 3 and FIG. 4, a rotor 27 that integrally rotates with the rotating shaft 26, and a stator 28 arranged on the outer peripheral side of the rotor 27 are provided inside the housing 25 of the MG 16. A coil 29 that includes a plurality of phase windings is wound around the stator 28.

Cooling oil 30 for cooling the MG 16 is accommodated inside a sealed space inside the housing 25. The cooling oil 30 is stored up to a height position higher than the lowermost surface of the rotor 27 and below the rotating shaft 26 of the rotor 27 in a rotation stopped state of the MG 16. When the MG 16 rotates, the cooling oil 30 is scooped up by the rotation of the rotor 27 and diffused into the housing 25. The cooling oil 30 is a liquid having an insulating property, and for example, a lubricating oil for an automobile such as a hydraulic fluid for automatic transmission (so-called ATF) or the like is used.

Furthermore, a coil temperature sensor 31 for detecting the temperature of the coil 29 and a cooling oil temperature sensor 32 for detecting the temperature of the cooling oil 30 are provided inside the housing 25. The coil temperature sensor 31 is installed at a position of the coil 29 that is not immersed in the cooling oil 30 when the rotation of the MG 16 is stopped. Moreover, the coil temperature sensor 31 is installed inside the coil 29 (in other words, on the inner peripheral side) and at a neutral point 33 of the coil 29. The cooling oil temperature sensor 32 is installed at a position immersed in the cooling oil 30 and separated from the coil 29 (in other words, a position not in contact with the coil 29). Furthermore, the cooling oil temperature sensor 32 is installed so as to be located below the lowermost surface of the rotor 27.

As illustrated in FIG. 1, the output signal of the coil temperature sensor 31 and the output signal of the cooling oil temperature sensor 32 are inputted to the MG-ECU 24. In this first embodiment, in order to prevent overheating of the coil 29 of the MG 16 and the cooling oil 30, overheating prevention control process is performed as described below by the MG-ECU 24 executing an overheating prevention routine illustrated in FIG. 6 and FIG. 7 described later. In the case where the temperature Tc of the coil 29 detected by the coil temperature sensor 31 exceeds a threshold value A for protecting the coil, a coil protection torque restriction for restricting the torque of the MG 16 is implemented. In addition, in the case where the temperature To of the cooling oil 30 detected by the cooling oil temperature sensor 32 exceeds a threshold value C for protecting the cooling oil, a cooling oil protection torque restriction for restricting the torque of the MG 16 is implemented.

In other words, when the coil protection torque restriction or the cooling oil protection torque restriction is implemented, the MG-ECU 24 controls the inverter 21 so as to reduce the AC voltage applied to the MG 16. Note that when the AC voltage applied to the MG 16 is decreased, the torque outputted from the MG 16 is reduced. Therefore, it is preferred that the HV-ECU 23 instructs the engine ECU to increase the engine output so as to compensate for the amount of decrease in the torque outputted from the MG 16.

Incidentally, in the MG 16 cooled by the cooling oil 30 inside the housing 25, portions that tend to overheat vary depending on the operating region. In other words, since the cooling oil 30 is scooped up by the rotation of the rotor 27, the cooling oil 30 is not sufficiently diffused in a region where the rotation speed of the MG 16 (in other words, the rotation speed of the rotor 27) is low, and the coil 29 easily becomes overheated. On the other hand, in the region where the rotation speed of the MG 16 is high, the cooling oil 30 is sufficiently diffused, which makes it difficult for the coil 29 to overheat, however, the amount of heat generated by the coil 29 is large, so it becomes easy for the cooling oil 30 to overheat.

Figure 5:
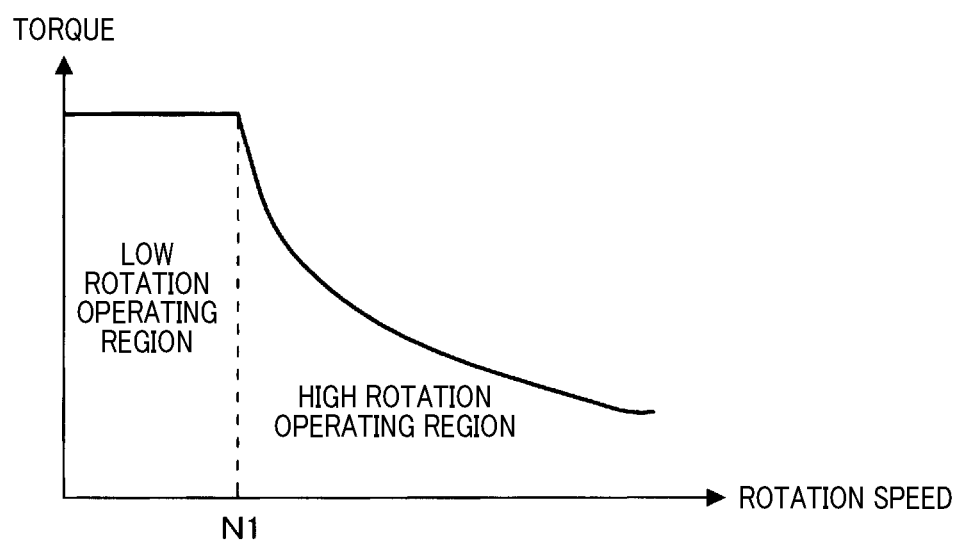
FIG. 5 is a diagram illustrating region divisions of a first embodiment.

Therefore, in this first embodiment, as illustrated in FIG. 5, the operating region of the MG 16 is divided into a low rotation operating region in which the MG 16 operates at a low rotation speed equal to or lower than a predetermined rotation speed N1, and a high rotation operating region that the MG 16 rotates at a high rotation speed that is higher than the predetermined rotation speed N1.

In addition, in the low rotation operating region, the coil protection torque restriction is made to be implemented more preferentially than the cooling oil protection torque restriction. More specifically, by setting the threshold value A for coil protection to be lower in the low rotation operating region than in the high rotation operating region, it becomes easy for the coil protection torque restriction to be implemented more preferentially (for example, earlier) than the cooling oil protection torque restriction. As a result, the coil protection torque restriction is preferentially implemented in the low rotation operating region that the coil 29 is likely to overheat so as to reliably prevent overheating of the coil 29. In other words, by decreasing the AC voltage applied to the MG 16, the amount of heat generated per unit time by the coil 29 is reduced, and overheating of the coil 29 is prevented.

On the other hand, in the high rotation operating region, it is easier for the cooling oil protection torque restriction to be implemented more preferentially than the coil protection torque restriction. More specifically, by setting the threshold value C for protecting the cooling oil in the high rotation operating region to a value lower than in the low rotation operation region, it becomes easier for the cooling oil protection torque restriction to be implemented more preferentially (for example, earlier) than the coil protection torque restriction. As a result, the cooling oil protection torque restriction is preferentially implemented in the high rotation operating region where the cooling oil 30 is likely to overheat so as to reliably prevent overheating of the cooling oil 30. In other words, since the AC voltage applied to the MG 16 is decreased, the amount of heat generated per unit time by the coil 29 is reduced. In addition, since the amount of heat transferred from the coil 29 to the cooling oil 30 also decreases, overheating of the cooling oil 30 is prevented.

Hereinafter, the processing contents of the overheating prevention routine in FIG. 6 and FIG. 7 executed by the MG-ECU 24 in the first embodiment will be explained.

Figure 6:
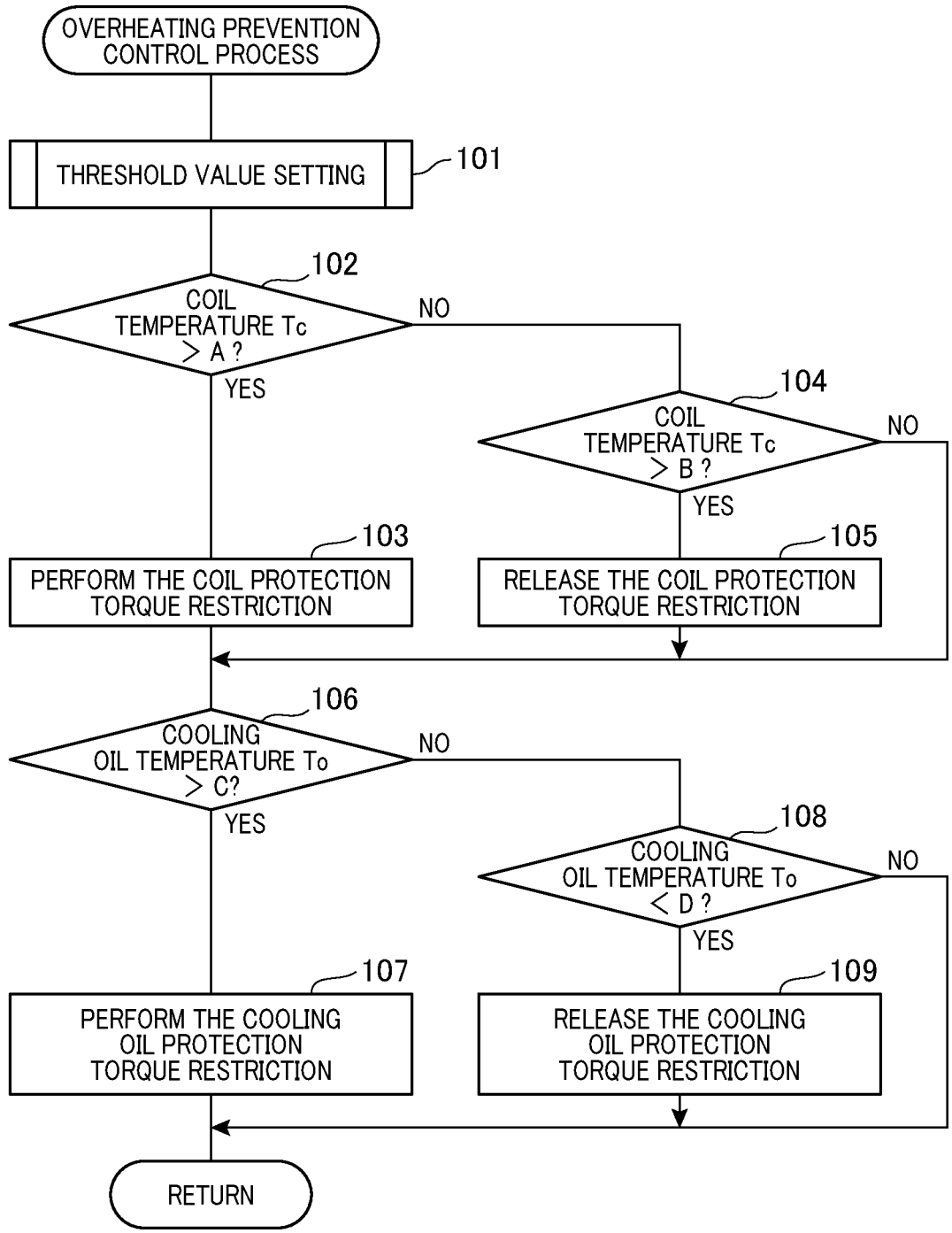
FIG. 6 is a flowchart illustrating the flow of processing of an overheating prevention control routine.

The overheating prevention control routine illustrated in FIG. 6 is repeatedly executed at predetermined intervals during the power-on period of the MG-ECU 24, and serves a role as a control unit. In addition, the threshold value setting routine illustrated in FIG. 7 is a subroutine executed in step 101 of FIG. 6, and serves a role as a control unit.

Figure 7:
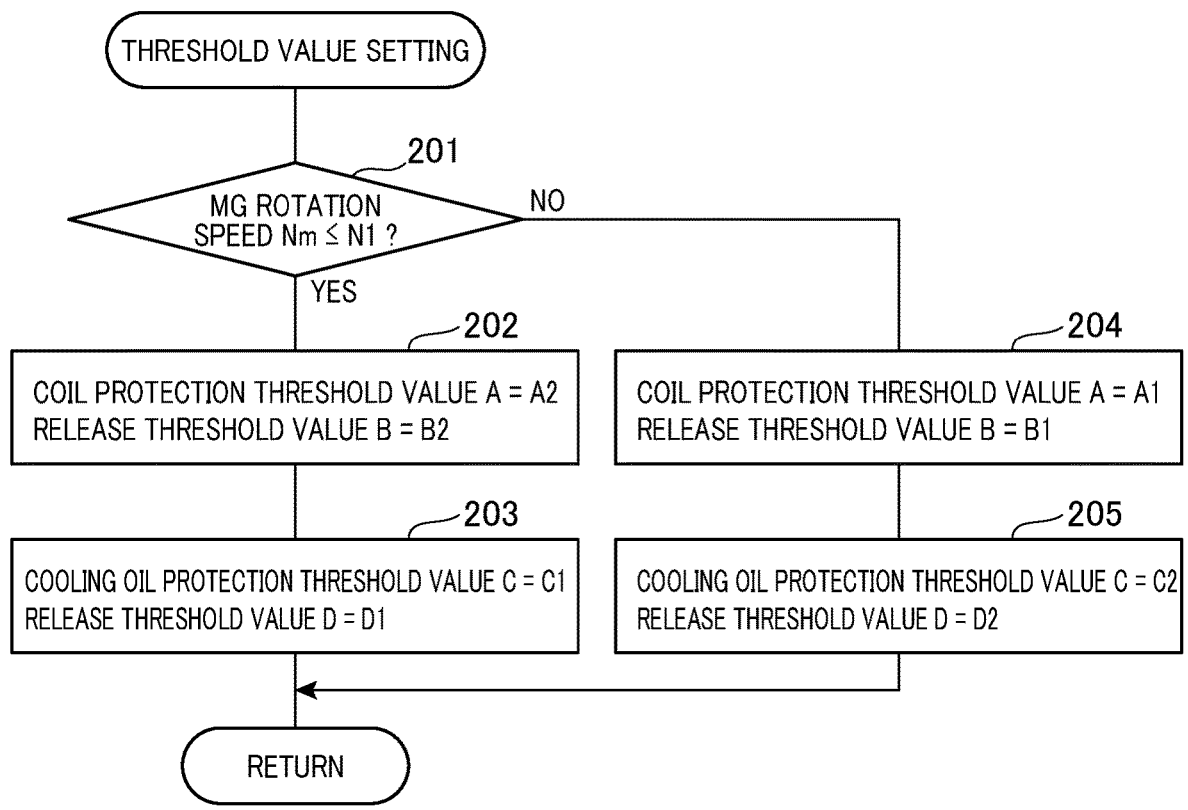
FIG. 7 is a flowchart illustrating the flow of processing of a threshold value setting routine of a first embodiment.

After the overheating prevention control routine in FIG. 6 has been activated, first, in step 101, the threshold value setting routine in FIG. 7 is executed. When this threshold value setting routine is activated, first, in step 201, it is determined whether or not the rotation speed Nm of the MG 16 is in the low rotation operating region, depending on whether or not the rotation speed Nm is equal to or less than a predetermined rotation speed N1.

In this step 201, in the case where it is determined that the rotation speed Nm of the MG 16 is equal to or less than the predetermined rotation speed N1, the operating region is determined to be the low rotation operating region. In this case, the process proceeds to step 202, where the coil protection threshold value A is set to A2 (180° C., for example), and the release threshold value B that is lower than the coil protection threshold A is set to B2.

Coil protection threshold value A=A2
Release threshold value B=B2

Here, A2 is set to a value lower than A1 (in other words, A2<A1), and B2 is set to a value lower than B1 (in other words, B2<B1). As a result, in the low rotation operating region that the coil is likely to generate heat, the coil protection threshold value A is set to a value lower than in the high rotation operating region, so the coil protection torque restriction can be easily made to be implemented more preferentially than the cooling oil protection torque restriction. Here, "easily made to be implemented more preferentially" described above does not necessarily mean that the restriction is preferentially implemented. The temperature of the coil and the temperature of the cooling oil are not always expressed by the same relational expression, and a temperature difference between both varies depending on environmental conditions. Therefore, even in a low rotation operating region, it is not absolutely the case that the cooling oil protection torque restriction is implemented and the coil protection torque restriction is not implemented. In the present embodiment, the fact that the coil protection torque restriction is more likely to be implemented preferentially than the cooling oil protection torque restriction means that the condition for the coil protection torque restriction to be implemented before the cooling oil protection torque restriction is wide. This definition applies hereinafter also.

After this, the process proceeds to step 203 where the threshold value C for cooling oil protection is set to C1 (for example, 120° C.), and the release threshold value D that is lower than the cooling oil protection threshold value C is set to D1.

Cooling oil protection threshold value C=C1
Release threshold value D=D1

Here, C1 is set to a value higher than C2 (in other words, C1>C2), and D1 is set to a value higher than D2 (in other words, D1>D2). As a result, in the low rotation operating region, the cooling oil protection threshold value C is set to a value higher than in the high rotation operating region.

On the other hand, in the case where it is determined in step 201 that the rotation speed Nm of the MG 16 is higher than the predetermined rotation speed N1, the region is determined to be the high rotation operating region. In this case, the process proceeds to step 204 where the coil protection threshold value A is set to A1 (for example, 200° C.) and the release threshold value B that is lower than the coil protection threshold value A is set to B1.

Coil protection threshold value A=A1
Release threshold value B=B1

Here, A1 is set to a value higher than A2 (in other words, A1>A2), and B1 is set to a value higher than B2 (in other words, B1>B2). As a result, in the high rotation operating region, the coil protection threshold value A is set to a value higher than in the low rotation operating region.

After this, the process proceeds to step 205 where the cooling oil protection threshold value C is set to C2 (for example, 100° C.), and the release threshold value D that is lower than the cooling oil protection threshold value C is set to D2.

Cooling oil protection threshold value C=C2
Release threshold value D=D2

Here, C2 is set to a value lower than C1 (in other words, C2<C1), and D2 is set to a value lower than D1 (in other words, D2<D1). As a result, in the high rotation operating region where the cooling oil is likely to generate heat, the cooling oil protection threshold value C is set to a value lower than in the low rotation operating region, so it is possible to make it easy to implement the cooling oil protection torque restriction more preferentially than the coil protection torque restriction.

After setting each threshold value A to D as described above, the process proceeds to step 102 in FIG. 6. In step 102, it is determined whether or not the temperature Tc of the coil 29 detected by the coil temperature sensor 31 is higher than the coil protection threshold value A.

In this step 102, in the case where it is determined that the temperature Tc of the coil 29 is higher than the coil protection threshold value A, the process proceeds to step 103. In this step 103, the coil protection torque restriction is implemented to restrict the torque of the MG 16 to a predetermined upper limit guard value (for example, the energizing of the MG 16 is controlled so that the torque of the MG 16 does not exceed the upper limit guard value).

On the other hand, in the above-described step 102, in the case where it is determined that the temperature Tc of the coil 29 is equal to or lower than the coil protection threshold value A, the process proceeds to step 104. In this step 104, it is determined whether or not the temperature Tc of the coil 29 detected by the coil temperature sensor 31 is lower than the release threshold value B.

In this step 104, in the case where it is determined that the temperature Tc of the coil 29 is lower than the releasing threshold B, the process proceeds to step 105, and the coil protection torque restriction is released.

In step 106, it is determined whether or not the temperature To of the cooling oil 30 detected by the cooling oil temperature sensor 32 is higher than the cooling oil protection threshold value C.

In this step 106, in the case where it is determined that the temperature To of the cooling oil 30 is higher than the cooling oil protection threshold value C, the process proceeds to step 107. In this step 107, the cooling oil protection torque restriction is implemented to restrict the torque of the MG 16 with a predetermined upper limit guard value (for example, the energizing of the MG 16 is controlled so that the torque of the MG 16 does not exceed the upper limit guard value).

On the other hand, in the above-described step 106, in the case where it is determined that the temperature To of the cooling oil 30 is equal to or lower than the cooling oil protection threshold value C, the process proceeds to step 108. In this step 108, it is determined whether or not the temperature To of the cooling oil 30 detected by the cooling oil temperature sensor 32 is lower than the release threshold value D.

In this step 108, in the case where it is determined that the temperature To of the cooling oil 30 is lower than the release threshold value D, the process proceeds to step 109, and the cooling oil protection torque restriction is released.

In the first embodiment described above, by implementing the coil protection torque restriction for restricting the torque of the MG 16 in the case where the temperature Tc of the coil 29 detected by the coil temperature sensor 31 exceeds the coil protection threshold value A, it is possible to prevent overheating of the coil 29. In addition, by implementing the cooling oil protection torque restriction for restricting the torque of the MG 16 in the case where the temperature To of the cooling oil 30 detected by the cooling oil temperature sensor 32 exceeds the cooling oil protection threshold value C, it is possible to prevent overheating of the cooling oil 30.

In addition, in the low rotation operating region, the coil protection torque restriction is made to be easily implemented more preferentially. As a result, it is possible to preferentially implement the coil protection torque restriction in the low rotation operating region where the coil 29 is likely to overheat so as to be able to reliably prevent overheating of the coil 29 and appropriately protect the coil 29. On the other hand, in the high rotation operating region, the cooling oil protection torque restriction is made to be easily implemented more preferentially. As a result, it is possible to preferentially implement the cooling oil protection torque restriction in the high rotation operating region where the cooling oil 30 is likely to overheat so as to be able to reliably prevent overheating of the cooling oil 30 and appropriately protect the cooling oil 30. Therefore, even in the case of a MG 16 for a vehicle in which the operating region changes frequently, it is possible to reliably protect the coil 29 and the cooling oil 30. In addition, by preventing overheating of the cooling oil 30, there is also an advantage in that it is possible to reduce the frequency of replacement of the cooling oil 30, or it becomes unnecessary to replace the cooling oil 30.

Moreover, in the first embodiment, in the low rotation operating region, by setting the coil protection threshold value A to a value lower than in the high rotation operating region, the coil protection torque restriction is made to be easily implemented more preferentially. As a result, in the low rotation operating region, when the temperature Tc of the coil 29 detected by the coil temperature sensor 31 exceeds the coil protection threshold A value that is lower than in the high rotation operating region, it is possible to start the coil protection torque restriction. Accordingly, the coil protection torque restriction can be preferentially implemented in the low rotation operating region where the coil 29 is likely to overheat, and the coil 29 can be reliably protected.

On the other hand, in the high rotation operating region, by setting the cooling oil protection threshold value C to a value lower than in the low rotation operating region, the cooling oil protection torque restriction is made to be easily implemented more preferentially. As a result, in the high rotation operating region, when the temperature of the cooling oil 30 detected by the cooling oil temperature sensor 32 exceeds the cooling oil protection threshold value C that is lower than in the low rotation operating region, the cooling oil protection torque restriction can be started. Accordingly, it is possible to preferentially implement the cooling oil protection torque restriction in the high rotation operating region that the cooling oil 30 is likely to overheat, and reliably protect the cooling oil 30.

Incidentally, a portion of the coil 29 that is not immersed in the cooling oil 30 at the time of stopping the rotation of the MG 16 is liable to have a higher temperature than a portion immersed in the cooling oil 30. Furthermore, the inside of the coil 29 tends to have a higher temperature than the outside of the coil 29. Moreover, a neutral point of the coil 29 is a portion that generates the most heat among the parts of the coil 29.

Therefore, in the first embodiment, the coil temperature sensor 31 is installed at a position of the coil 29 that is not immersed in the cooling oil 30 when the rotation of the MG 16 in the coil 29 is stopped, and furthermore, is positioned inside the coil 29 at the neutral point of the coil 2. As a result, the coil temperature sensor 31 can detect the temperature of the portion of the coil 29 that tends to become a high temperature, so that the coil protection torque restriction based on the detection value of the coil temperature sensor 31 is started at an appropriate timing, and appropriate overheating prevention can be performed.

In addition, in the first embodiment, the cooling oil temperature sensor 32 is installed at a position immersed in the cooling oil 30 and at a position separated from the coil 29. As a result, the temperature of the cooling oil 30 can always be detected by the cooling oil temperature sensor 32. Furthermore, the cooling oil 30 is scooped up by the rotation of the rotor 27, so taking into consideration that the oil level of the cooling oil 30 does not fall below the lowermost surface of the rotor 27, the cooling oil temperature sensor 32 is installed at a position lower than the lowermost surface of the rotor 27. Thus, the cooling oil temperature sensor 32 can always be immersed in the cooling oil 30.

Moreover, in the first embodiment, the cooling oil 30 is enclosed in a sealed space inside the housing 25 and is stored up to a height position higher than the lowermost surface of the rotor 27 and below the rotating shaft 26 of the rotor 27. By storing the cooling oil 30 up to a height position higher than the lowermost surface of the rotor 27, a heat inside the MG 16 is efficiently conducted to the housing 25 via the cooling oil 30 and discharged to the outside of the MG 16. As a result, it is possible to effectively cool the MG 16. Furthermore, by storing the cooling oil 30 up to a height position lower than the rotating shaft 26 of the rotor 27, it is possible to appropriately suppress the amount of the cooling oil 30 to be sealed and appropriately suppress the rotational load of the MG 16 due to the cooling oil 30.

Note that in the first embodiment, the coil temperature sensor 31 is installed inside the coil 29 and at the neutral point of the coil 29. However, the technique according to the present disclosure is not limited to this, and the coil temperature sensor 31 may be installed outside the coil 29 or at a position other than the neutral point of the coil 29.

Second Embodiment

Next, a second embodiment according to the present disclosure will be explained using FIG. 8 and FIG. 9. However, an explanation of substantially the same or similar parts as those of the first embodiment will be omitted or simplified, and parts different from the first embodiment will be mainly explained.

Figure 8:
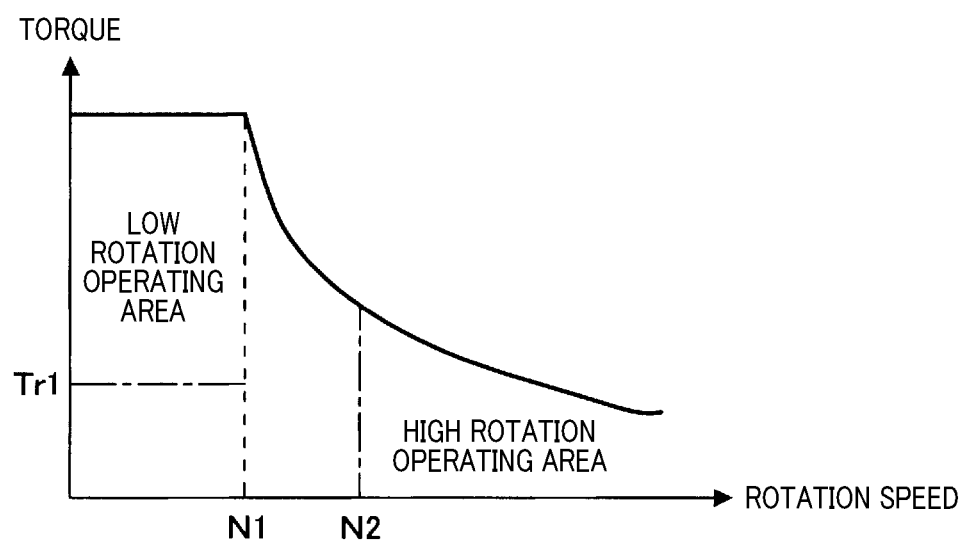
FIG. 8 is a diagram illustrating region divisions of a second embodiment.

In this second embodiment, as illustrated in FIG. 8, the low rotation operating region is divided into a region that the torque Tm of the MG 16 is larger than a predetermined value Tr1 and a region that the torque Tm is equal to or less than the predetermined value Tr1. Here, the predetermined value Tr1 is set, for example, to the upper limit value of a torque that can continuously operate without the MG 16 overheating, or a value slightly lower than that.

Furthermore, the high rotation operating region is divided into a region where the rotation speed Nm of the MG 16 is higher than a predetermined value N2 and a region where the rotation speed Nm is equal to or less than the predetermined value N2. Here, the predetermined value N2 is set, for example, to the upper limit value or a slightly lower value of a rotation speed at which the cooling oil 30 and air are mixed and diffused by rotation of the rotor 27 (for example, a bubble state).

Figure 9:
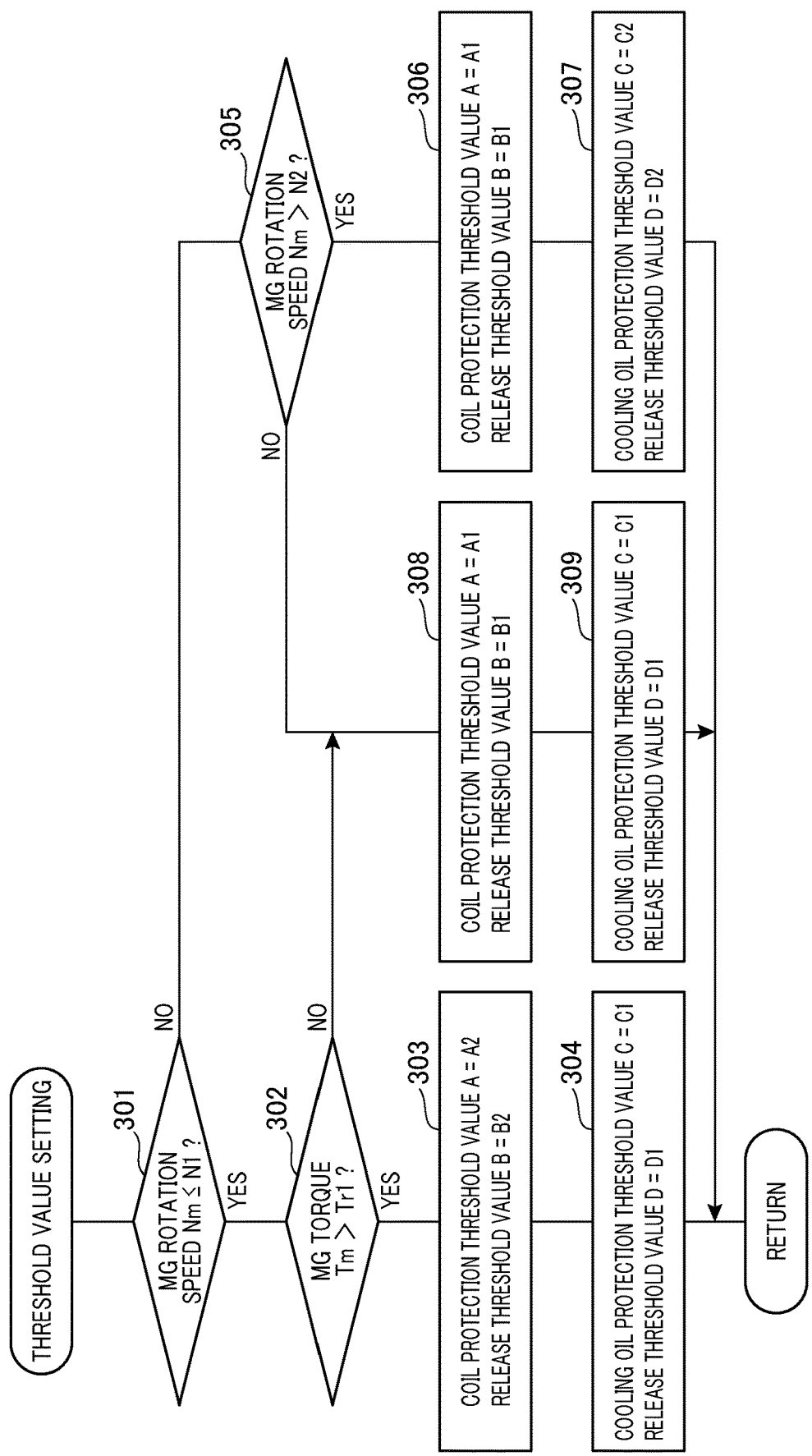
FIG. 9 is a flowchart illustrating the flow of processing of a threshold setting routine of a second embodiment.

Then, instead of the routine in FIG. 7 described in the first embodiment, the routine in FIG. 9 is executed by the MG-ECU 24. As a result, in the low rotation operating region and in the region that the torque Tm of the MG 16 is equal to or less than the predetermined value Tr1, the coil protection threshold value A is set to the same value as in the high rotation operating region. In addition, in the high rotation operating region and in the region where the rotation speed Nm of the MG 16 is equal to or less than the predetermined value N2, the cooling oil protection threshold value C is set to the same value as in the low rotation operating region.

In the threshold value setting routine of FIG. 9, first, in step 301, whether or not the region is in the low rotation operating region is determined by determining whether or not the rotation speed Nm of the MG 16 is equal to or lower than the predetermined rotation speed N1.

In this step 301, in the case where it is determined that the rotation speed Nm of the MG 16 is equal to or lower than the predetermined rotation speed N1, the region is determined to be the low rotation operating region. In this case, the process proceeds to step 302 where it is determined whether or not the torque Tm of the MG 16 is larger than the predetermined value Tr1.

In this step 302, in the case where it is determined that the torque Tm of the MG 16 is greater than the predetermined value Tr1 the process proceeds to step 303 where the coil protection threshold value A is set to A2 and the release threshold value B is set to B2.

Coil protection threshold value A=A2
Release threshold value B=B2

As a result, in the low rotation operating region and in the region that the torque Tm of the MG 16 is larger than the predetermined value Tr1, the coil protection threshold value A is set to a value lower than in the high rotation operating region so that the coil protection torque restriction is easily implemented more preferentially than the cooling oil protection torque restriction.

After this, the process proceeds to step 304 where the cooling oil protection threshold value C is set to C1 and the release threshold value D is set to D1.

Cooling oil protection threshold value C=C1
Release threshold value D=D1

On the other hand, in the case where it is determined in the above-described step 302 that the torque Tm of the MG 16 is equal to or less than the predetermined value Tr1, the process proceeds to step 308, the coil protection threshold value A is set to A1, and the release threshold value B is set to B1.

Coil protection threshold value A=A1
Release threshold value B=B1

As a result, in the low rotation operating region and in the region that the torque Tm of the MG 16 is equal to or less than the predetermined value Tr1, the coil protection threshold value A is set to the same value as in the high rotation operating region.

After this, the process proceeds to step 309, the cooling oil protection threshold value C is set to C1, and the release threshold value D is set to D1.

Cooling oil protection threshold value C=C1
Release threshold value D=D1

On the other hand, in the case where it is determined in the above-described step 301 that the rotation speed Nm of the MG 16 is higher than the predetermined rotation speed N1, the region is determined to be the high rotation operating region. In this case, the process proceeds to step 305, and it is determined whether or not the rotation speed Nm of the MG 16 is higher than the predetermined value N2.

In this step 305, in the case where it is determined in step 305 that the rotation speed Nm of the MG 16 is higher than the predetermined value N2, the process proceeds to step 306 where the coil protection threshold value A is set to A1 and the release threshold value B is set to B1.

Coil protection threshold value A=A1
Release threshold value B=B1

After this, the process proceeds to step 307, the cooling oil protection threshold value C is set to C2, and the release threshold value D is set to D2.

Cooling oil protection threshold value C=C2
Release threshold value D=D2

As a result, in the high rotation operating region and in the region where the rotation speed Nm of the MG 16 is higher than the predetermined value N2, the cooling oil protection threshold value C is set to a value lower than in the low rotation operating region and the cooling oil protection torque restriction is made to be easily implemented more preferentially than the coil protection torque restriction.

On the other hand, in the case where it is determined in the above-described step 305 that the rotation speed Nm of the MG 16 is equal to or less than the predetermined value N2, the process proceeds to step 308 where the coil protection threshold value A is set to A1, and the release threshold value B is set to B1.

Coil protection threshold value A=A1
Release threshold value B=B1

After this, the process proceeds to step 309, the cooling oil protection threshold value C is set to C1, and the release threshold value D is set to D1.

Cooling oil protection threshold value C=C1
Release threshold value D=D1

As a result, in the high rotation operating region and in the region where the rotation speed Nm of the MG 16 is and equal to or less than the predetermined value N2, the cooling oil protection threshold value C is set to the same value as in the low rotation operating region.

In the second embodiment described above, in the low rotation operating region and in the region that the torque Tm of the MG 16 is equal to or less than the predetermined value Tr 1, the coil protection threshold value A is set to the same value as in the high rotation operating region. As a result, it is possible to avoid unnecessary torque restriction in the low rotation operating region and in the region that the torque Tm of the MG 16 is equal to or less than the predetermined value Tr1, or in other words, in the low rotation operating region that the amount of heat generated by the coil 29 is small, it is possible to perform suitable overheating prevention according to the operating state of the MG 16.

Furthermore, in the second embodiment, in the high rotation operating region and in the region where the rotation speed Nm of the MG 16 is equal to or less than the predetermined value N2, the cooling oil protection threshold value C is set to the same value as in the low rotation operating region. As a result, in the high rotation operating region and in the region where the rotation speed Nm of the MG 16 is equal to or lower than the predetermined value N2, or in other words, in the high rotation operating region that the amount of heat generated by the coil 29 is small and the cooling effect of the cooling oil 30 is large, it is possible to avoid unnecessary torque restriction and suitable overheating prevention can be performed according to the operating state of the MG 16.

Note that in this second embodiment, the process of setting the coil protection threshold value A to the same value as in the high rotation operating region when in the low rotation operating region and in the region that the torque Tm of the MG 16 is equal to or less than the predetermined value Tr1, and the process of setting the cooling oil protection threshold value C to the same value as in the low rotation operating region when in the high rotation operating region and in the region that the rotation speed Nm of the MG 16 is equal to or less than the predetermined value N2, are both performed, however, the technique is not limited to this, and it is possible to perform only one of these processes.

Third Embodiment

Next, a third embodiment according to the present disclosure will be explained using FIG. 10. However, an explanation of substantially the same or similar parts as those of the first embodiment will be omitted or simplified, and parts different from the first embodiment will be mainly explained.

Figure 10:
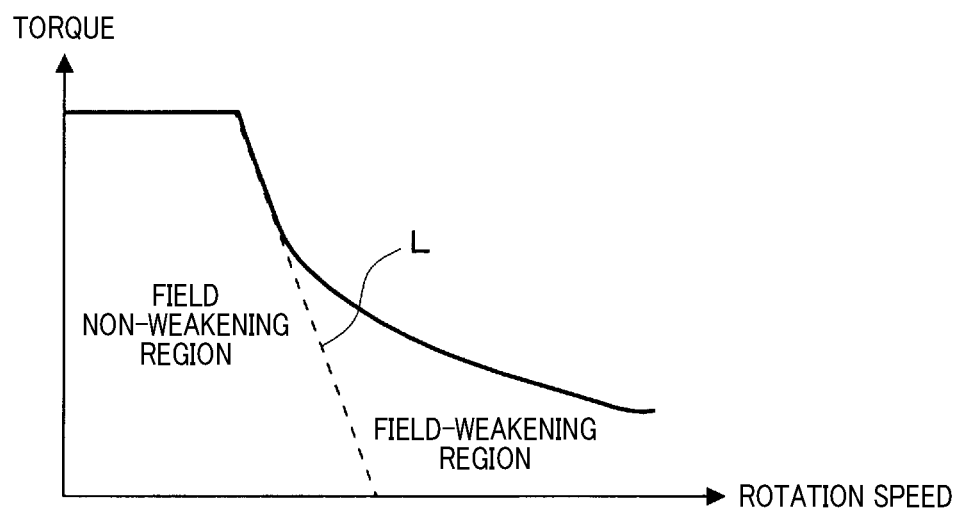
FIG. 10 is a diagram illustrating region divisions of a third embodiment.

In the third embodiment, as illustrated in FIG. 10, the operating region of the MG 16 is divided according to the rotation speed, torque, voltage, and the like of the MG 16, into a field non-weakening region in which field-weakening control process of the MG 16 is not performed and a field-weakening region in which field-weakening control process of the MG 16 is performed. Here, the field-weakening control process is control for decreasing the magnetic flux in the d-axis direction by utilizing the demagnetization effect due to the armature reaction, by causing, for example, a negative d-axis current (in other words, excitation current) to flow.

The field non-weakening region is a low rotation operating region in which the MG 16 operates further on the low rotation side than the boundary line L with the field-weakening region. In the field non-weakening region, the MG-ECU 24, for example, controls energizing of the MG 16 by sinusoidal wave PWM control. The field-weakening region is a high rotation operating region in which the MG 16 operates further on the higher rotation side than the boundary line L with the field non-weakening region. In the field-weakening region, the MG-ECU 24, for example, controls energizing of the MG 16 by rectangular wave control or over-modulation control.

In addition, the MG-ECU 24 makes it easy to preferentially implement the coil protection torque restriction in the field non-weakening region (for example, the coil protection threshold value is set to a value lower than in the field-weakening region). The field non-weakening region is a region that the MG 16 operates at a lower rotation speed than in the field-weakening region. Therefore, by making it easy for the coil protection torque restriction to be preferentially implemented in the field non-weakening region, it is possible to preferentially implement the coil protection torque restriction in the low rotation operating region that the coil 29 is likely to overheat, and thus the coil 29 can be suitably protected.

Furthermore, the MG-ECU 24 makes it easier for the cooling oil protection torque restriction to be preferentially implemented in the field-weakening region (for example, the cooling oil protection threshold value is set to a value lower than in the field non-weakening region). The field-weakening region is a region in which the MG 16 operates at a higher rotation speed than in the field non-weakening region. Therefore, by making it easier for the cooling oil protection torque restriction to be preferentially implemented in the field-weakening region, the cooling oil protection torque restriction is preferentially implemented in the high rotation operating region where the cooling oil 30 is likely to overheat, so it is possible to suitably protect the cooling oil 30.

Fourth Embodiment

Next, a fourth embodiment according to the present disclosure will be explained using FIG. 11. However, an explanation of substantially the same or similar parts as those of the first embodiment will be omitted or simplified by using identical reference numerals, and parts different from the first embodiment will be mainly explained.

Since the cooling oil 30 is scooped up by the rotation of the rotor 27, it becomes more difficult for the cooling oil 30 to be applied the closer to the advancing side of the rotation direction of the rotor 27 in a range of the coil 29 that is not immersed in the cooling oil 30, and the cooling oil 30 tends to become high temperature. Therefore, in this fourth embodiment, as illustrated in FIG. 11, the coil temperature sensor 31 is installed on the advancing side in the rotation direction of the rotor 27 (for example, in the rotation direction corresponding to the forward direction of the vehicle) within a range of the coil 29 that is not immersed in the cooling oil 30 when the rotation of the MG 16 is stopped. As a result, it is possible for the coil temperature sensor 31 to detect the temperature of a portion of the coil 29 that tends to become high temperature.

In addition, since the cooling oil 30 is scooped up by the rotation of the rotor 27, the cooling oil 30 tends to be biased toward the advancing side in the rotation direction of the rotor 27. Therefore, in this fourth embodiment, as illustrated in FIG. 11, the cooling oil temperature sensor 32 is installed on the advancing side in the rotation direction of the rotor 27 (for example, the rotation direction corresponding to the forward direction of the vehicle) within the range immersed in the cooling oil 30. As a result, the cooling oil temperature sensor 32 can always be immersed in the cooling oil 30.

Figure 11:
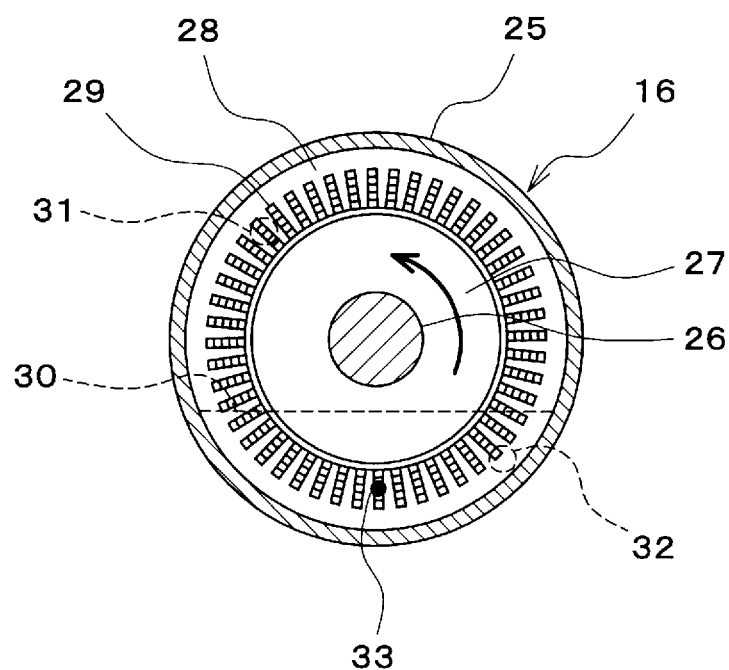
FIG. 11 is a transverse sectional view illustrating a schematic configuration of the MG of a fourth embodiment.

Furthermore, in this fourth embodiment, as illustrated in FIG. 11, the coil 29 is arranged so that a neutral point 33 of the coil 29 is immersed in the cooling oil 30. In an oil-tight configuration in which the cooling oil 30 is enclosed in a sealed space inside the housing 25, although the cooling performance is lowered compared to a configuration in which the cooling oil 30 is circulated outside the MG 16, by immersing the neutral point 33, which is the portion of the coil 29 that generates the most heat, in the cooling oil 30, it is possible to effectively cool the coil 29.

Note that in this fourth embodiment as well, the coil temperature sensor 31 may be installed inside the coil 29. Alternatively, the coil temperature sensor 31 may be installed outside the coil 29. In the case where there are a plurality of neutral points, the coil may be arranged so as to be positioned on the advancing side in the rotation direction of the rotor 27 in a range where one neutral point is immersed in the cooling oil 30 and another neutral point is not immersed in the cooling oil 30, and the coil temperature sensor 31 may be installed at the other neutral point.

Fifth Embodiment

Next, a fifth embodiment according to the present disclosure will be explained using FIG. 12. However, an explanation of substantially the same or similar parts as those of the first embodiment will be omitted or simplified by using identical reference numerals, and parts different from the first embodiment will be mainly explained.

Figure 12:
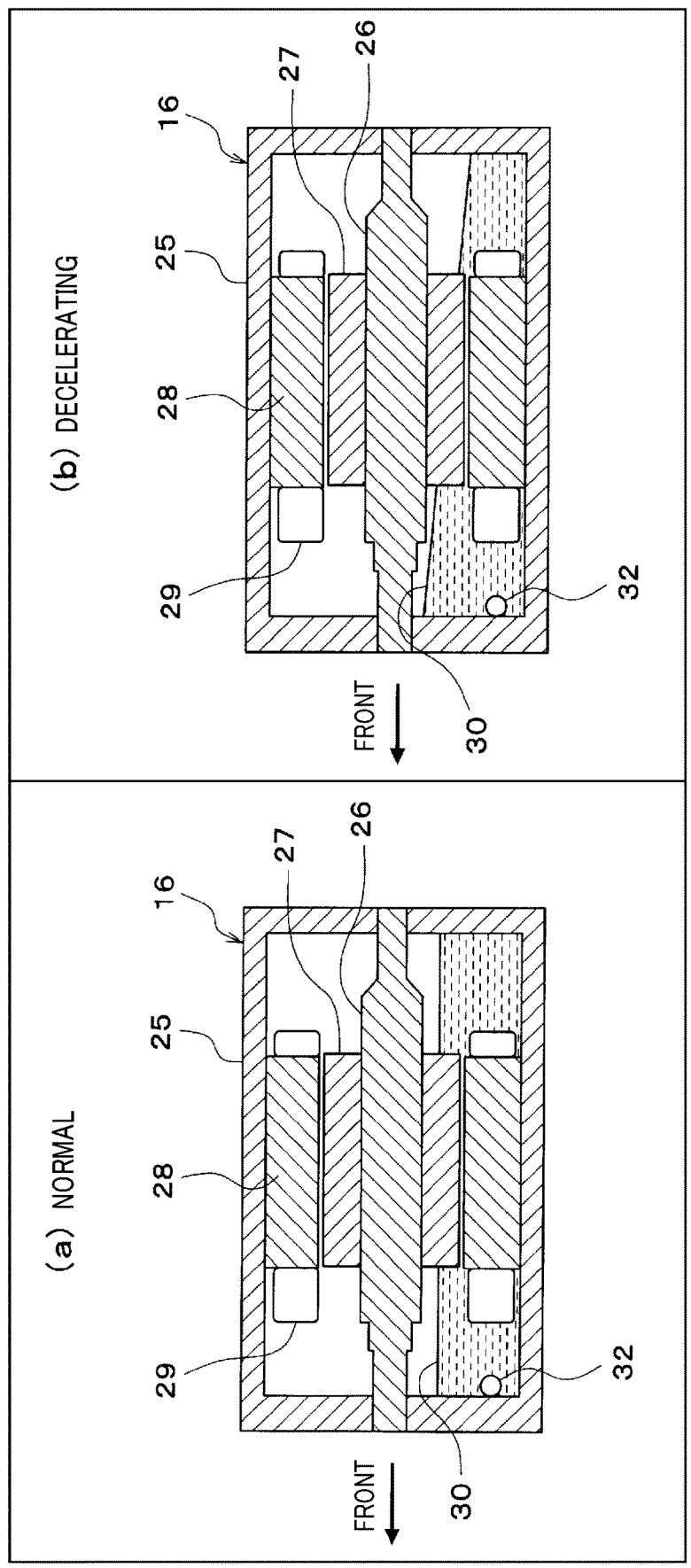
FIG. 12 is a longitudinal sectional view illustrating a schematic configuration of the MG of a fifth embodiment.

In this fifth embodiment, as illustrated in FIG. 12, the MG 16 is arranged so that the axial direction of the MG 16 (in other words, the direction parallel to the rotating shaft 26) is the front-rear direction of the vehicle. By installing the cooling oil temperature sensor 32 on the front side in the axial direction inside the housing 25 (for example, on the front side of the rotor 27 and the stator 28), the cooling oil temperature sensor 32 is installed inside the portion of the housing 25 on the front side of the vehicle. As a result, as illustrated in (b) of FIG. 12, even when the cooling oil 30 moves to the front side of the vehicle (in other words, the front side inside the housing 25) during deceleration (for example, during regenerative power generation) in which the MG 16 is used frequently, the temperature of the cooling oil 30 can be reliably detected by the cooling oil temperature sensor 32.

Sixth Embodiment

Next, a sixth embodiment according to the present disclosure will be explained using FIG. 13. However, an explanation of substantially the same or similar parts as those of the first embodiment will be omitted or simplified by using identical reference numerals, and parts different from the first embodiment will be mainly explained.

Figure 13:
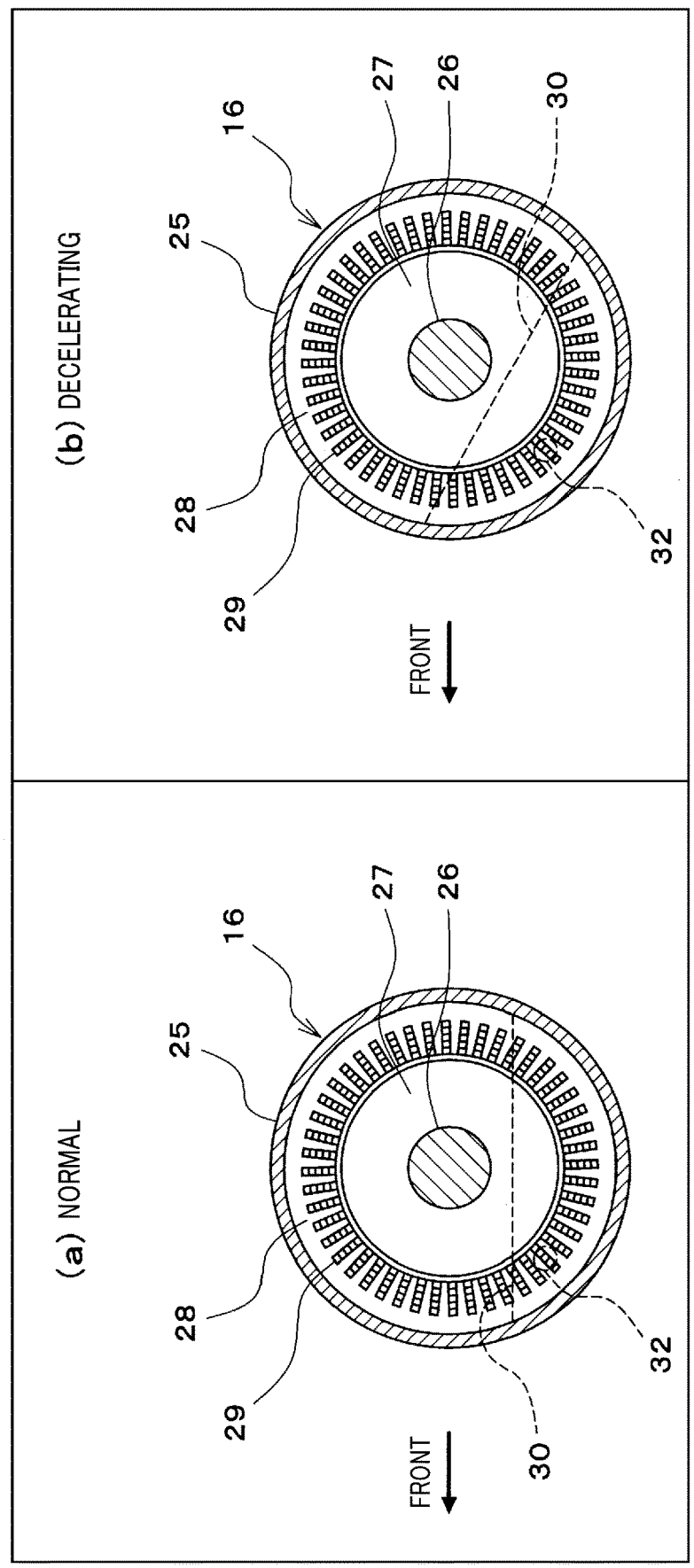
FIG. 13 is a transverse sectional view illustrating a schematic configuration of the MG of a sixth embodiment.

In this sixth embodiment, as illustrated in FIG. 13, the MG 16 is arranged so that the direction perpendicular to the axial direction of the MG 16 (that is, the direction perpendicular to the rotating shaft 26) is the front-rear direction of the vehicle. Then, by installing the cooling oil temperature sensor 32 on the front side in the direction perpendicular to the axial direction of the inside of the housing 25 (for example, further on the front side of the rotating shaft 26), the cooling oil temperature sensor 32 is installed inside the portion of the housing 25 on the front side of the vehicle. As a result, as illustrated in (b) of FIG. 13, even when the cooling oil 30 moves to the front side of the vehicle (in other words, the front side inside the housing 25) during deceleration (for example, during regenerative power generation) in which the MG 16 is used frequently, the temperature of the cooling oil 30 can be reliably detected by the cooling oil temperature sensor 32.

Seventh Embodiment

Next, a seventh embodiment according to the present disclosure will be explained using FIG. 14. However, an explanation of substantially the same or similar parts as those of the first embodiment will be omitted or simplified by using identical reference numerals, and parts different from the first embodiment will be mainly explained.

Figure 14:
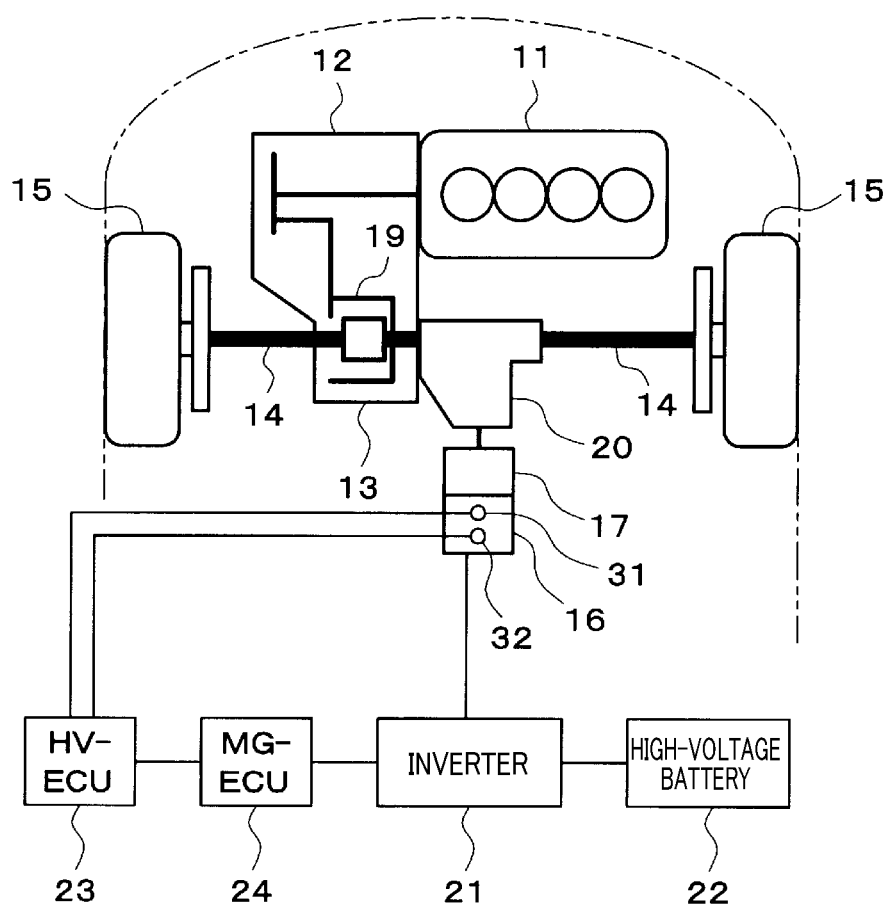
FIG. 14 is a diagram illustrating a schematic configuration of a control system for a hybrid vehicle of a seventh embodiment.

In this seventh embodiment, as illustrated in FIG. 14, the output signal of the coil temperature sensor 31 and the output signal of the cooling oil temperature sensor 32 are inputted to the HV-ECU 23. Then, the overheating prevention control process explained in the first to third embodiments is performed using this HV-ECU 23. In this case as well, the same effect as in the above embodiments can be obtained.

In each of the above-described embodiments, some or all of the functions performed using the MG-ECU 24 and the HV-ECU 23 may be configured using hardware such as by one or a plurality of ICs or the like.

In addition, in each of the above-described embodiments, the cooling oil 30 is stored up to a height position lower than the rotating shaft 26 of the rotor 27, however the technique according to the present disclosure is not limited to this, and the cooling oil 30 may be stored up to a height position higher than the rotating shaft 26 of the rotor 27. Moreover, configuration is possible in which the cooling oil 30 is circulated outside the MG 16.

In each of the above-described embodiments, the temperature of the cooling oil 30 is detected using the cooling oil temperature sensor 32. However, the method for detecting the cooling oil temperature is not limited to the cooling oil temperature sensor 32. For example, a temperature sensor may be arranged in the wall of the housing 25, and the temperature of the cooling oil 30 may be estimated based on the temperature of the wall surface of the housing 25. The same applies to the coil temperature sensor 31, and the method for detecting the coil temperature is not limited to the coil temperature sensor 31. More specifically, configuration is possible in which the coil temperature is estimated.

Furthermore, in each of the above-described embodiments, configuration is such that the cooling oil 30 is sealed inside the housing 25 and does not circulate inside or outside the housing. However, an opening may be provided in the housing, and an oil pipe connecting to an oil cooler or an oil pump may be connected to this opening. In this case, configuration is such that the cooling oil 30 moves in and out of the housing.

In addition, the technique according to the present disclosure is not limited to a hybrid vehicle having the configuration illustrated in FIG. 1 and FIG. 14, and can be applied to a motor of a hybrid vehicle having various configurations in which an engine and a motor are mounted as power sources of the vehicle. Moreover, the technique according to the present disclosure is not limited to a hybrid vehicle, and the technique according to the present disclosure may be applied to a motor of an electric vehicle mounted with only a motor as a power source of the vehicle. Furthermore, the technique according to the present disclosure may be applied to a motor other than a power source of a vehicle.

Embodiments have been described above with reference to specific examples. However, the technique according to the present disclosure is not limited to these specific examples. Appropriate design modifications added to these specific examples by those skilled in the art are also included in the scope of the technique according to the present disclosure as long as they have features disclosed in the present disclosure. Each of the elements and the arrangement, the conditions, the shape, and the like thereof of the specific examples described above are not limited to those exemplified above, and can be appropriately changed. Each of the elements included in each of the above-described specific examples can be appropriately changed in combination as long as no technical inconsistency occurs.

The invention claimed is:

1. A motor control device for a motor having a stator and a rotor arranged inside a housing, the stator and the rotor being cooled by cooling oil inside the housing such that, when the rotor is stationary, a level of the cooling oil inside the housing reaches a height position higher than a lowermost surface of the rotor, the motor control device comprising:
    coil temperature detecting means for detecting a temperature of a coil provided on the stator;
    cooling oil temperature detecting means for detecting a temperature of the cooling oil; and
    a control unit configured (i) to implement a coil protection torque restriction for restricting a torque of the motor in a case where a temperature of the coil detected by the coil temperature detecting means exceeds a coil protection threshold value, and (ii) to implement a cooling oil protection torque restriction for restricting the torque of the motor in a case where a temperature of the cooling oil detected by the cooling oil temperature detecting means exceeds a cooling oil protection threshold value, wherein
    the control unit sets the coil protection threshold value to be lower in a low rotation operating region than in a high rotation operating region, the low rotation operating region being a region in which the motor operates at a low rotation speed equal to or lower than a predetermined value, and the high rotation operating region being a region in which the motor operates at a higher rotation speed than in the low rotation operating region; and
    the control unit sets the cooling oil protection threshold value to be lower in the high rotation operating region than in the low rotation operating region.

2. The motor control device according to claim 1, wherein the control unit, in the low rotation operating region and in a region that the torque of the motor is equal to or less than a predetermined value, sets the coil protection threshold value to the same value as in the high rotation operating region.

3. The motor control device according to claim 1, wherein the control unit, in the high rotation operating region and in a region that the torque of the motor is equal to or less than a predetermined value, sets the oil protection threshold value to the same value as in the low rotation operating region.

4. The motor control device according to claim 1, wherein the low rotation operating region is a field non-weakening region where field-weakening control process of the motor is not performed.

5. The motor control device according to claim 1, wherein the high rotation operating region is a field-weakening region where field-weakening control process of the motor is performed.

6. The motor control device according to claim 1, wherein the coil temperature detecting means is a coil temperature sensor installed at a position of the coil that is not immersed in the cooling oil when rotation of the motor is stopped.

7. The motor control device according to claim 6, wherein the coil temperature sensor is installed inside the coil.

8. The motor control device according to claim 6, wherein the coil temperature sensor is installed at a neutral point of the coil.

9. The motor control device according to claim 6, wherein the coil temperature sensor is installed on an advancing side in a rotation direction of the rotor within a range in which the coil is not immersed in the cooling oil when rotation of the motor is stopped.

10. The motor control device according to claim 1, wherein
    the cooling oil temperature detecting means is installed at a position immersed in the cooling oil and separated from the coil.

11. The motor control device according to claim 10, wherein
    the cooling oil temperature detecting means is installed below the lowermost surface of the rotor.

12. The motor control device according to claim 10, wherein
    the cooling oil temperature detecting means is installed on an advancing side in a rotation direction of the rotor within a range immersed in the cooling oil.

13. The motor control device according to claim 1, wherein
    the cooling oil is enclosed in a sealed space inside the housing, and is stored up to a height position above the lowermost surface of the rotor and below a rotating shaft of the rotor.

14. The motor control device according to claim 13, wherein
    the coil is arranged so that at least one neutral point is immersed in the cooling oil.

15. The motor control device according to claim 1, wherein
    the motor is mounted as a power source of a vehicle.

16. The motor control device according to claim 15, wherein
    the cooling oil temperature detecting means is installed inside a portion of the housing on front side of the vehicle.

17. The motor control device according to claim 1, wherein
    the cooling oil temperature detecting means is a cooling oil temperature sensor.

* * * * *